(No Model.)

E. P. USHER.
STORAGE BATTERY.

No. 509,266. Patented Nov. 21, 1893.

UNITED STATES PATENT OFFICE.

EDWARD P. USHER, OF GRAFTON, MASSACHUSETTS, ASSIGNOR TO THE HOPE-DALE ELECTRIC COMPANY OF WEST VIRGINIA, OF WEST VIRGINIA.

STORAGE-BATTERY.

SPECIFICATION forming part of Letters Patent No. 509,266, dated November 21, 1893.

Application filed January 23, 1893. Serial No. 459,473. (No model.)

*To all whom it may concern:*

Be it known that I, EDWARD P. USHER, of Grafton, in the county of Worcester and State of Massachusetts, have invented certain new and useful Improvements in Storage-Batteries, of which the following, taken in connection with the accompanying drawings, is a specification.

This invention relates to storage batteries, and its object is to secure a more perfect connection between the series of plates and the transverse bar or lug which unites them.

My invention consists in a transverse bar or lug of metallic lead or equivalent material, formed with a series of openings through it to receive the upwardly projecting stems of the several positive or negative plates, such openings being countersunk on the upper side or, in other words, having upwardly diverging side walls, preferably with two distinct inclines, to facilitate the application of solder and admit the tip of the soldering iron, in combination with a series of plates each having a shouldered vertical stem or lug the reduced upper end of which is adapted to fit snugly within one of the openings in said bar and to extend nearly or quite through it, while the shoulder bears against the under surface of the bar, making a perfect fit when the series of plates are connected by such bar and the solder is applied, filling the space each side of the tips of the lugs and covering their upper ends.

In the drawings, Figure 1 is a top view and Fig. 2 a longitudinal vertical section of the lug-connecting device. Figs. 3 and 4 are side and edge elevations of one of the plates or frames to be connected by such device. Fig. 5 is a vertical section, showing the parts so connected.

A represents a suitable frame for a plate and B the upwardly extending lug thereof, formed with a horizontal shoulder C near its top and a reduced tip D extending above the shoulder.

E represents a transverse connecting device of peculiar construction, consisting of a leaden bar formed with a series of openings F through it of a shape at bottom to receive snugly the reduced tip D of the lug B, and with side walls diverging upwardly, so as to admit the solder G freely along each side of such projecting tip. I prefer to increase the obliquity of the sides toward the top, as shown, so as to give abundant space for the soldering iron.

The shoulder C, fitting closely against the bottom of the connecting bar E, gives a firm connection and prevents the solder from running out. I usually depress the central portion of the upper surface of the bar, and fill in the solder freely and cover the top as well as the sides at the tip D of the lug, as indicated in Fig. 5, one of the openings being there shown as yet unfilled.

The importance of my present improvement will be obvious from the fact that the most efficient battery in all other respects will be rendered practically valueless if there is not a substantially perfect connection between the several plates of a series and the transverse bar which unites them all. My device accomplishes this result in a manner quite superior to anything heretofore known.

I make no present claim to the frame for a battery plate represented in Figs. 3 and 4, as such frame or plate forms part of my invention described and claimed in my application for patent on secondary battery electrodes, filed September 16, 1893, Serial No. 485,691.

I claim as my invention—

1. In a storage battery, a succession of plates, each having an upwardly projecting stem or lug formed with a horizontal shoulder or collar around it and a prolonged tip of less diameter than said shoulder or collar, in combination with a transverse bar of metallic lead or its equivalent formed with a series of openings through it, each fitting at bottom the prolonged tip of the lug of one of the plates and diverging upwardly therefrom to admit solder and the soldering tool, substantially as set forth.

2. In a storage battery, a series of suitable plates, each with a shouldered vertical stem or lug, in combination with a transverse bar connecting the several lugs and formed with a flat bottom and a series of vertical openings through it adapted to fit upon said shouldered stem, such openings having side walls increasing in obliquity from the bottom upwardly, substantially as set forth.

In testimony whereof I have signed my name to this specification, in the presence of two subscribing witnesses, on this 21st day of January, A. D. 1893.

EDWARD P. USHER.

Witnesses:
A. H. SPENCER,
THOMAS J. KENNY.